United States Patent
Ishikawa et al.

(10) Patent No.: US 6,212,321 B1
(45) Date of Patent: Apr. 3, 2001

(54) OPTICAL CABLE

(75) Inventors: Hiroki Ishikawa; Yoshiyuki Suetsugu; Gen Morikawa, all of Kanagawa; Hideyuki Iwata, Ibaraki, all of (JP)

(73) Assignees: Sumitomo Electric Industries, Ltd., Osaka; Nippon Telegraph and Telephone Corporation, Tokyo, both of (JP)

( * ) Notice: Subject to any disclaimer, the term of this patent is extended or adjusted under 35 U.S.C. 154(b) by 0 days.

(21) Appl. No.: 09/523,732

(22) Filed: Mar. 13, 2000

(30) Foreign Application Priority Data

Mar. 25, 1999 (JP) .................................................. 11-082287

(51) Int. Cl.$^7$ ...................................................... G02B 6/44
(52) U.S. Cl. ............................................................ 385/111
(58) Field of Search ..................................... 385/100–112

(56) References Cited

U.S. PATENT DOCUMENTS 5,638,478  6/1997  Iwakura et al. .

FOREIGN PATENT DOCUMENTS 8-211264  8/1996  (JP) .
9-049949  2/1997  (JP) .

*Primary Examiner*—Akm E. Ullah
(74) *Attorney, Agent, or Firm*—McDermott, Will & Emery (57) ABSTRACT

In the optical cable in accordance with the present invention, the reversal angle φ from one reverse portion to the next reverse portion in an S-Z type helical groove is at least 180 degrees; and, letting W, T, and n be the width and thickness of each optical fiber ribbon and the number of stacked sheets of optical fiber ribbons, respectively, and a and b be the width and depth of the helical groove, respectively, at least each reverse portion of the helical groove has a cross-sectional form satisfying:

$$nT < a \leq \sqrt{W^{2+(nT)^2}} \quad (1)$$

$$W < b \quad (2)$$

whereas the remaining portion of the helical groove has a cross-sectional form satisfying:

$$\sqrt{W^{2+(nT)^2}} < \min(a, b) \quad (3).$$

8 Claims, 10 Drawing Sheets

OPTICAL CABLE

BACKGROUND OF THE INVENTION

1. Field of the Invention

The present invention relates to an optical cable having an S-Z type helical groove for containing stacked optical fiber ribbons.

2. Related Background Art

As a technique in such a field, Japanese Patent Application Laid-Open No. HEI 8-211264 has been known. This publication discloses a technique in which the width and depth of an S-Z type helical groove provided in a chamber element are made greater than the diagonal of a stack of optical fiber ribbons.

SUMMARY OF THE INVENTION

The above-mentioned conventional optical cable has the following problems. Namely, while it is preferred that the optical fiber ribbons be contained within the S-Z type helical groove from the viewpoint of securing a long-term reliability, it is necessary to keep the optical fiber ribbons from collapsing within the groove from the viewpoint of preventing transmission loss from increasing due to cabling. In particular, it has been known that the stack of optical fiber ribbons generally tends to move toward the opening of the groove in the vicinity of reverse portions of the groove in order to reduce the curvature of the optical fiber ribbons. Therefore, if the groove width is broader than necessary in the conventional optical cable, then the stack may rotate within the groove, whereby the form of the stack may collapse, which may cause transmission loss to increase.

In order to overcome the above-mentioned problems, it is an object of the present invention to provide, in particular, an optical cable which reliably inhibits, over the whole length of a stack of optical fiber ribbons contained in a helical groove of a chamber element, the stack from collapsing.

For overcoming the above-mentioned problems, the optical cable in accordance with the present invention is an optical cable comprising a tension member disposed at a center thereof, an elongated chamber element having at least one S-Z type helical groove whose direction of strand on an outer periphery reverses periodically, and a plurality of optical fiber ribbons stacked within the helical groove of the chamber element; wherein a reversal angle from one reverse portion to a next reverse portion in the helical groove is at least 180 degrees; and wherein, letting W, T, and n be the width and thickness of each optical fiber ribbon and the number of stacked optical fiber ribbons, respectively, and a and b be the width and depth of the helical groove, respectively, at least the reverse portions of the helical groove have a cross-sectional form satisfying:

$$nT < a \leq \sqrt{W^2 + (nT)^2} \quad (1)$$

$$W < b \quad (2)$$

whereas the remaining portion of the helical groove has a cross-sectional form satisfying:

$$\sqrt{W^2 + (nT)^2} < \min(a, b) \quad (3)$$

In this optical cable, the twist of the stack itself is peaked in the reverse portions of the helical groove, so that the form of the stack is most likely to collapse there. Hence, the width of the helical groove is made smaller than the length of the diagonal of the stack at least in the reverse portions, whereby the stack is reliably prevented from collapsing when moving from the groove bottom toward the groove opening. In the portion where the stack is hard to collapse, on the other hand, the width and depth of the helical groove are made greater than the length of the diagonal of the stack, so that the stack is contained within the helical groove with a margin. Namely, in this portion, the relative movement of the helical groove with respect to the stack is made smooth. Therefore, the stack can be contained in a stable state over the whole length of the helical groove, whereby transmission loss is appropriately inhibited from increasing due to the collapsing of the stack.

Alternatively, the optical cable in accordance with the present invention is an optical cable comprising a tension member disposed at a center thereof, an elongated chamber element having at least one S-Z type helical groove whose direction of strand on an outer periphery reverses periodically, and a plurality of optical fiber ribbons stacked within the helical groove of the chamber element; wherein a reversal angle from one reverse portion to a next reverse portion in the helical groove is at least 180 degrees; and wherein, letting W, T, and n be the width and thickness of each optical fiber ribbon and the number of stacked optical fiber ribbons, respectively, and a and b be the width and depth of the helical groove, respectively, the helical groove has a cross-sectional form satisfying the above-mentioned expressions (1) and (2) in an area where a rotational angle with reference to a transit center portion located between neighboring reverse portions is at least 90 degrees, whereas the remaining portion of the helical groove has a cross-sectional form satisfying the above-mentioned expression (3).

In this optical cable, the twist of the stack itself is peaked in the reverse portions of the helical groove, so that the form of the stack is most likely to collapse there. Hence, the width of the helical groove is made smaller than the length of the diagonal of the stack in an area where the rotational angle with reference to a transit center portion located between neighboring reverse portions is at least 90 degrees, i.e., in the area where the stack is likely to collapse within the helical groove, whereby the stack is reliably prevented from collapsing when moving from the groove bottom toward the groove opening. In the portion where the stack is hard to collapse, on the other hand, the width and depth of the helical groove are made greater than the length of the diagonal of the stack, so that the stack is contained within the helical groove with a margin. Namely, in this portion, the relative movement of the helical groove with respect to the stack is made smooth. Therefore, the stack can be contained in a stable state over the whole length of the helical groove, whereby transmission loss is appropriately inhibited from increasing due to the collapsing of the stack.

Here, it is preferred that the cross-sectional form of the helical groove of the chamber element have a bottom portion which is substantially shaped like an arc. As a consequence, it becomes easier for the stack within the helical groove to shift to a state having the least twist.

Letting r be the radius of the arc of the bottom portion of this helical groove, it is preferred that $$\frac{\sqrt{W^2 + (nT)^2}}{2} \leq r \quad (4)$$

be satisfied.

Preferably, a stack constituted by a plurality of the optical fiber ribbons is contained in the helical groove with a ribbon plane thereof facing the bottom face of the helical groove in the vicinity of the transit center portion located between neighboring reverse portions, whereas the stack is contained in the helical groove with a ribbon side face thereof facing the bottom face of the helical groove in the vicinity of the reverse portions. When the stack is contained within the helical groove in such a state, the transmission loss of coated optical fibers can be suppressed as much as possible.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a perspective view showing a chamber element used in the optical cable of FIG. 1, whereas

DESCRIPTION OF THE PREFERRED EMBODIMENTS

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

Figure 1:
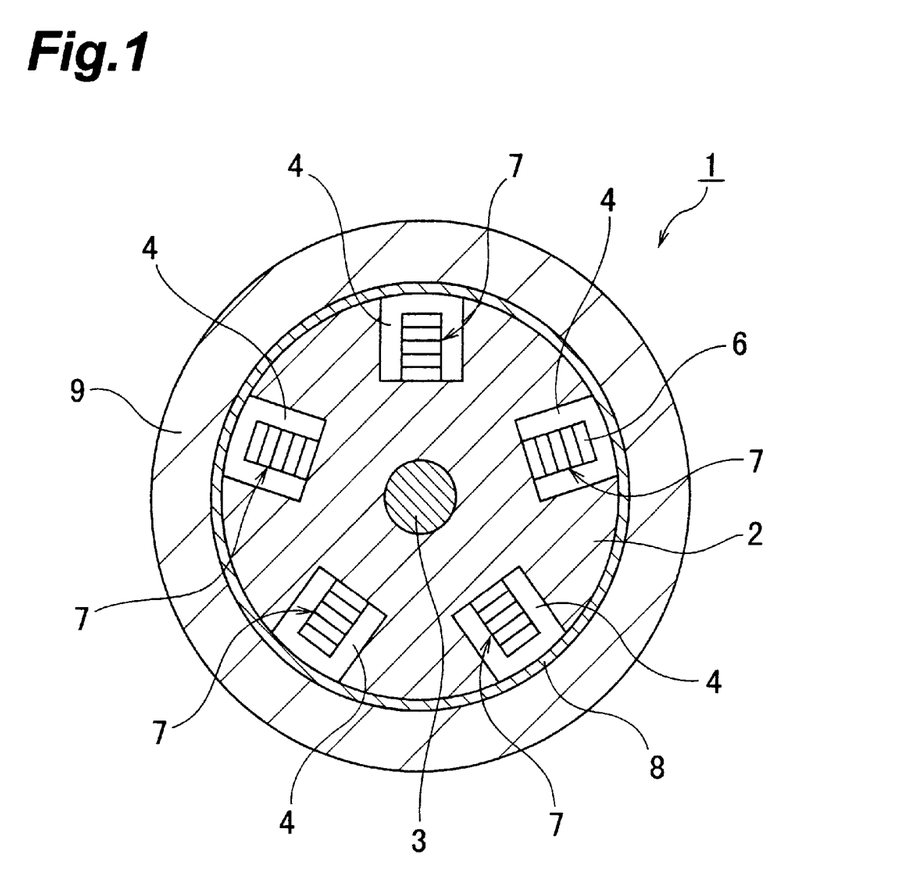
FIG. 1 is a sectional view showing an embodiment of the optical cable in accordance with the present invention.

FIG. 1 is a sectional view showing the optical cable in accordance with the present invention. The optical cable 1 shown in this drawing has a cylindrical elongated chamber element 2 extending over the whole length thereof, whereas a tension member 3 made of a steel wire, FRP, kevlar™, or the like is embedded in the chamber element 2 at the center thereof. Further, the peripheral face of the chamber element 2 is formed with five S-Z type helical grooves 4 each extending in the longitudinal direction and having a rectangular cross section. Within each helical groove 4, a stack 7 constituted by five stacked optical fiber ribbons 6 is contained. A pressing wrap 8 made of nylon threads and nonwoven tapes is employed in the optical cable 1 while in a state where the stack 7 is contained within the helical groove 4, and a sheath 9 made of polyethylene envelops the pressing wrap 8.

Figure 2:
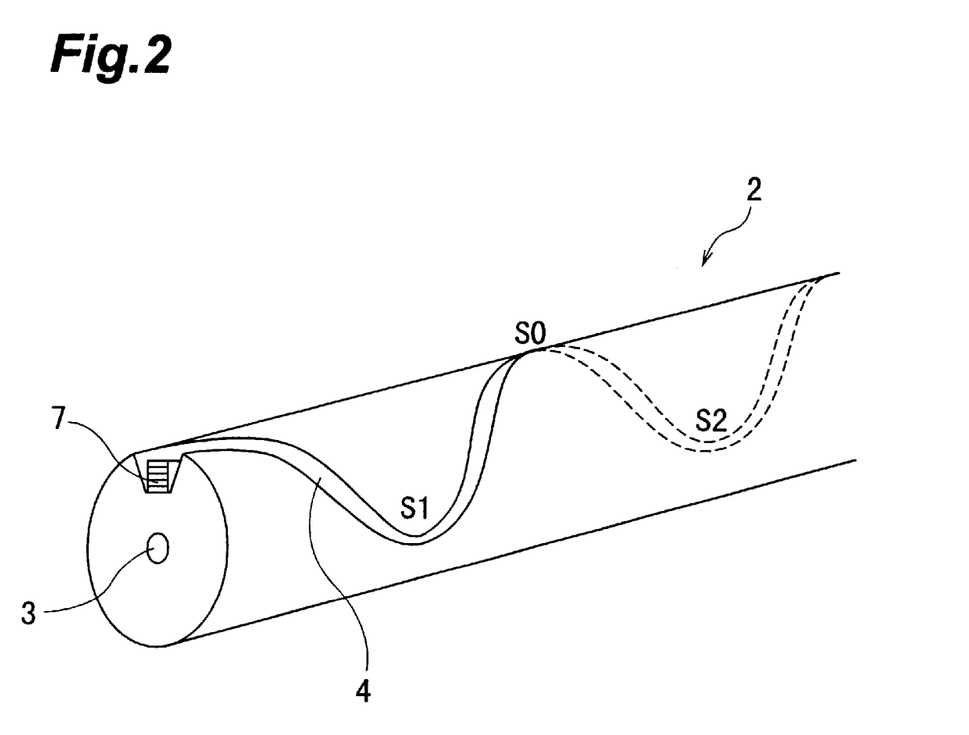
Figure 3A:
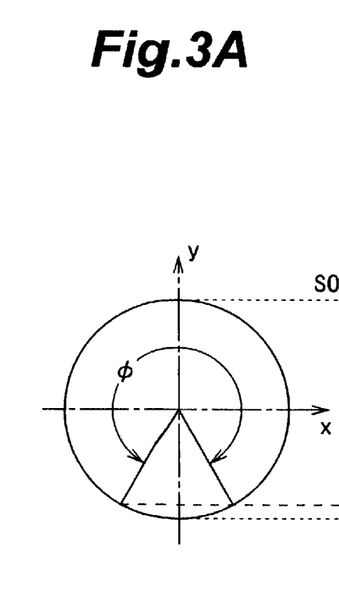
FIGS. 3A and 3B are schematic views for explaining a helical groove thereof.
Figure 3B:
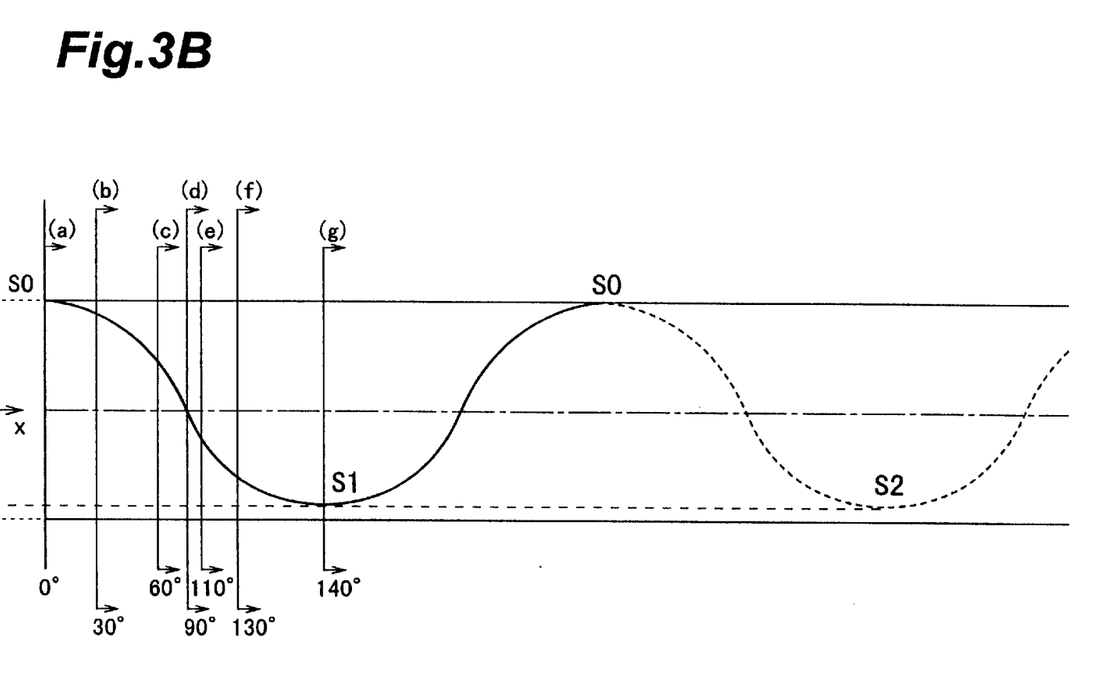
Figure 4:
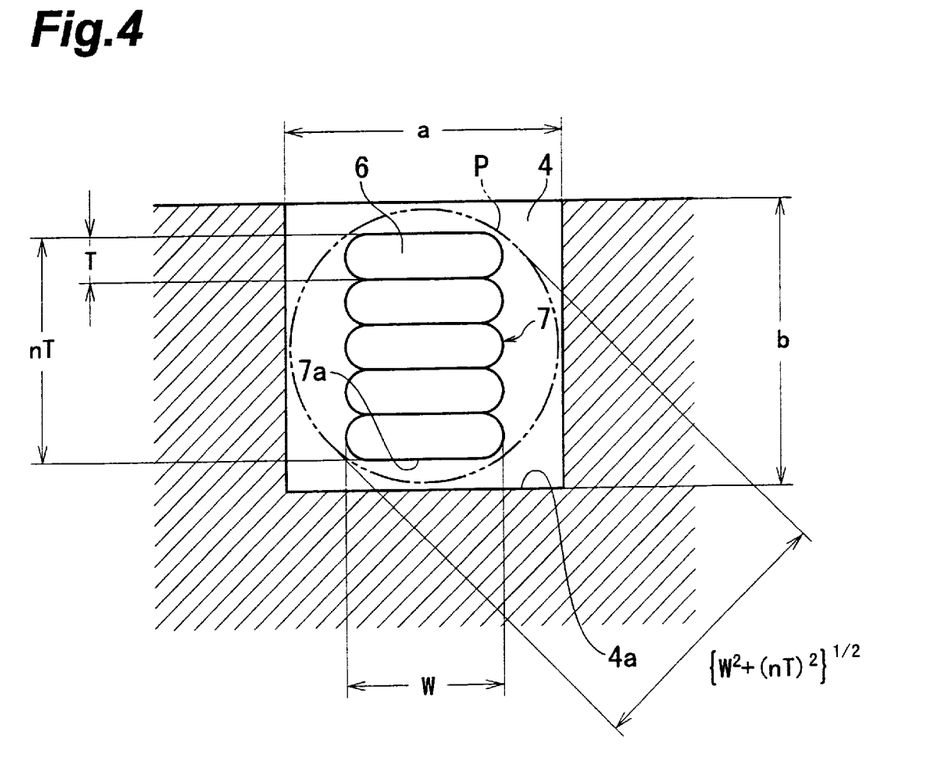
FIGS. 4 and 5 are sectional views of the helical groove in a transit center portion and a reverse portion, respectively.

As shown in FIGS. 2, 3A, and 3B, the S-Z type helical groove 4 is formed with a predetermined period in the chamber element 2, such that a transit portion is formed between a reverse portion S1 and a reverse portion S2, with a transit center portion S0 being located in the middle thereof. FIGS. 3A and 3B schematically show these portions. Here, symbol $\phi$ indicates the reversal angle of the helical groove 4 from the reverse portion S1 to the next reverse portion S2. In these drawings, the reversal angle $\phi$ is 280 degrees.

Figure 5:
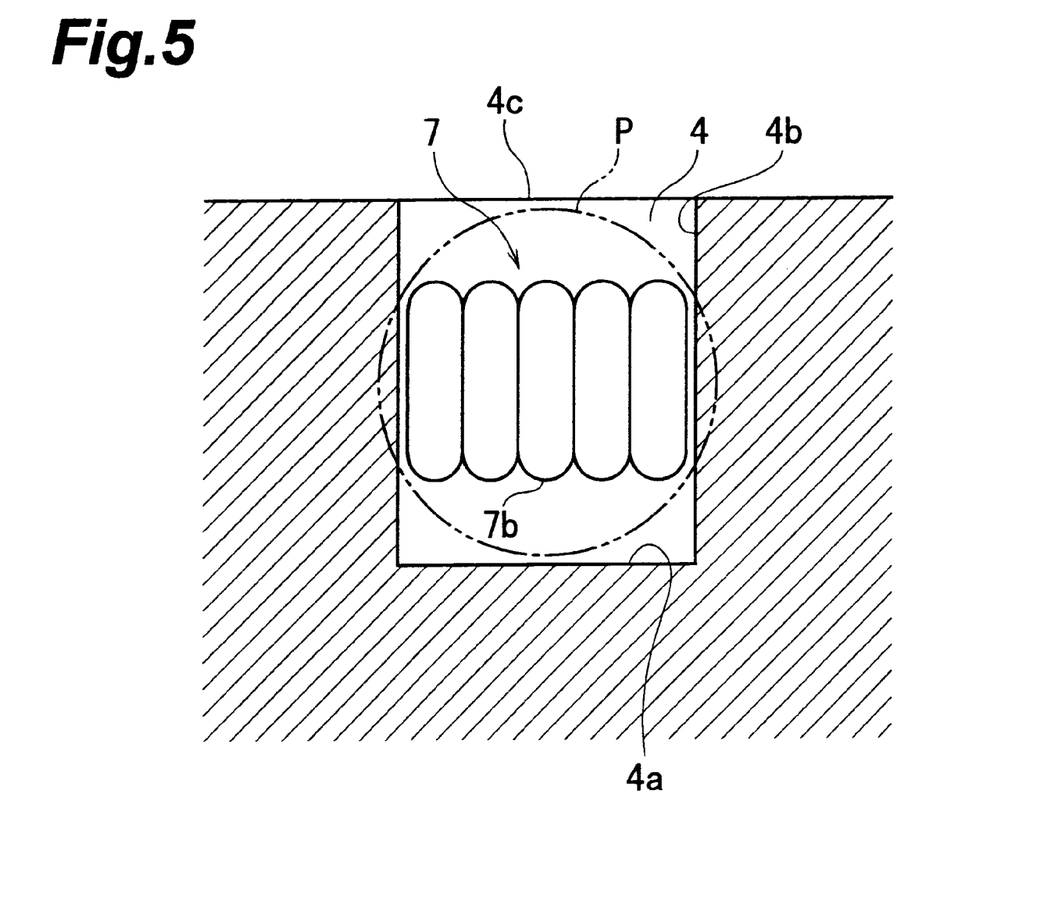

As shown in FIGS. 2, 3A, 3B, and 4, in the transit center portion S0, the stack 7 is contained within the helical groove 4 while in a state where a ribbon plane 7a of the stack 7 faces the bottom face 4a of the helical groove 4. On the other hand, as shown in FIG. 5, the stack 7 is contained within the helical groove 4 in the reverse portions S1 and S2 while in a state where a ribbon side face 7b faces the bottom face 4a of the helical groove 4. It is necessary that such contained states be maintained over the whole length of the cable 1.

These states will be explained with reference to FIGS. 3A, 3B, and 6A to 6G. Here, sectional views at positions indicated by (a) to (g) in FIG. 3B correspond to FIGS. 6A to 6G, respectively. Namely, in the area extending from the position (a) (see FIG. 6A) corresponding to the transit center portion S0 to a predetermined position (d) (see FIG. 6D) rotated by 90 degrees therefrom in the helical groove 4, the stack 7 is contained within the helical groove 4 in an untwisted state. Namely, in this area, the stack 7 is hard to collapse within the helical groove 4, and the helical groove 4 relatively rotates with respect to the stack 7. On the other hand, in the area where the rotational angle with reference to the transit center portion S0 exceeds 90 degrees until it reaches the reverse portion S2, i.e., from the predetermined position (d) to a predetermined position (g) (see FIGS. 6D to 6G) in the helical groove 4, the stack 7 is likely to collapse within the helical groove 4, and distortion stress is likely to occur in each optical fiber ribbon 6 upon forcible bending.

Figure 6A:
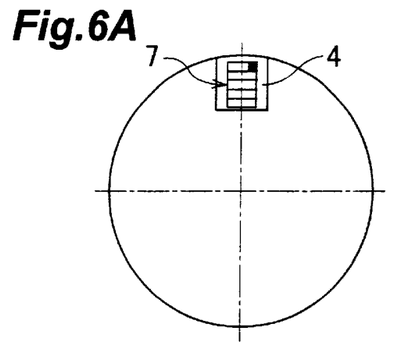
FIGS. 6A to 6G are schematic views showing respective contained states of the stack at different positions within the helical groove in the case of the optical cable in accordance with the present invention.
Figure 6B:
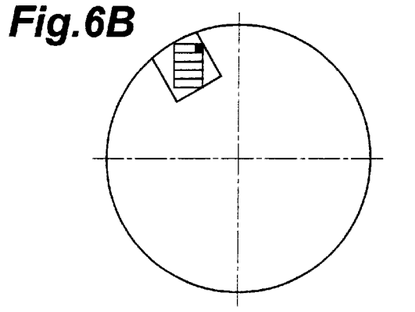
Figure 6C:
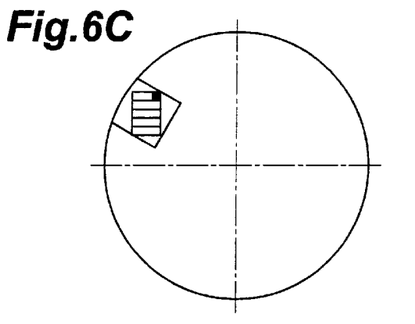
Figure 6D:
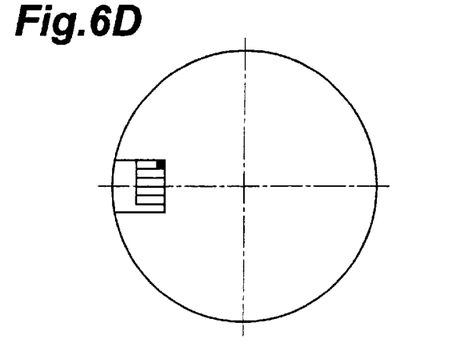
Figure 6E:
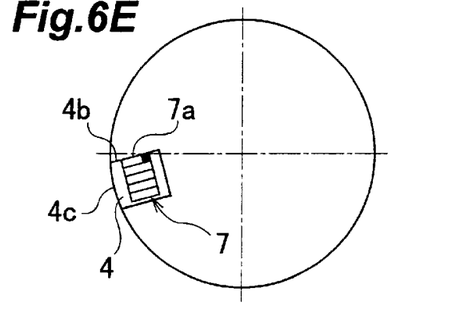
Figure 6F:
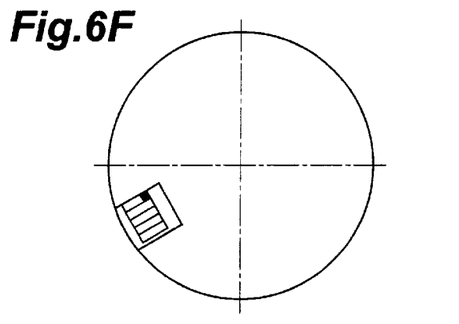
Figure 6G:
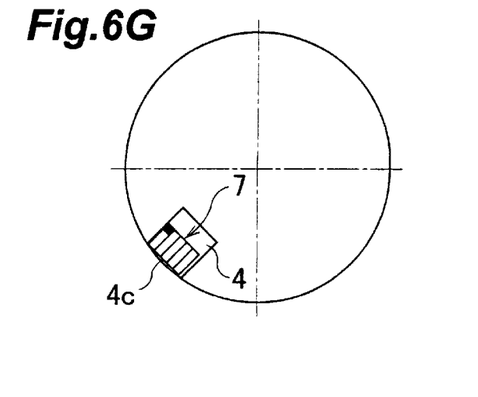

Therefore, for coping with such discrepancies, it is preferred that, while the state where the ribbon plane 7a of the stack 7 abuts against the side wall face 4b located on the upper side of the helical groove 4 is being maintained as shown in FIG. 6E, the stack 7 itself be moved toward the opening 4c of the helical groove 4 as shown in FIG. 6G.

Figure 8:
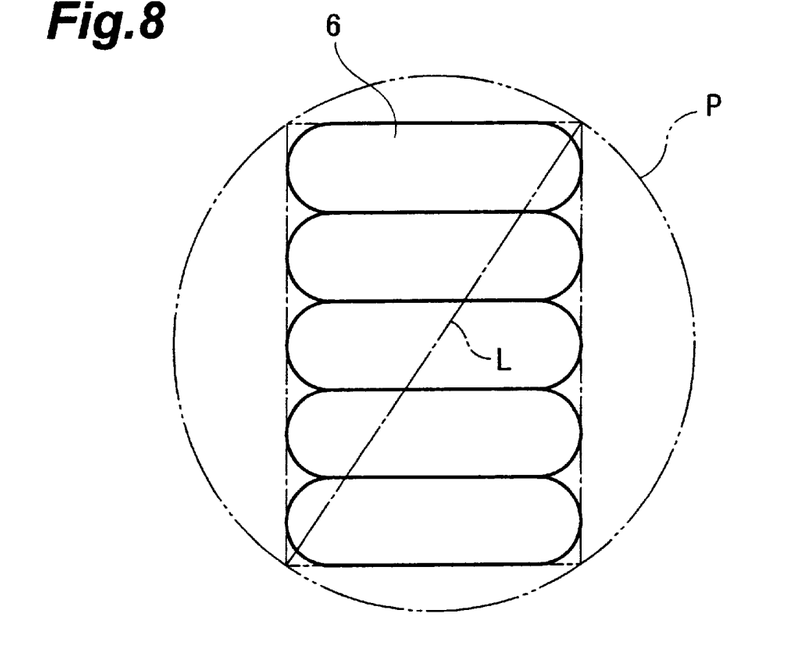
FIG. 8 is a schematic view showing the diagonal and outer periphery of a stack.

For realizing this, the size of the helical groove 4 in the area extending from the position (a) (see FIG. 6A) corresponding to the transit center portion S0 to the predetermined position (d) (see FIG. 6D) rotated by 90 degrees therefrom is needed to be such that the stack 7 is allowed to rotate smoothly with respect to the helical groove 4, since the stack 7 rotates relative to the helical groove 4 in this area. Therefore, letting W, T, and n be the width and thickness of each optical fiber ribbon 6 and the number of stacked optical fiber ribbons 6, respectively, and a and b be the width and depth of the helical groove 4, respectively, both of the width a and depth b of the helical groove 4 in this portion are needed to be greater than the length $\sqrt{W^2+(nt)^2}$ of the diagonal L of the stack 7 when the latter is assumed to be a rectangle. Here, as shown in FIG. 8, P is a circumscribed circle of the stack 7, which touches each apex of the stack 7 when the latter is assumed to be a rectangle (indicated by the dash-single-dot line) for the sake of convenience, whereas L is the diagonal thereof.

In the area extending from the position (d) (see FIG. 6D) to the position (g) (see FIG. 6G) corresponding to the reverse portion S2, on the other hand, it is hardly necessary for the stack 7 to be rotated relative to the helical groove 4. Therefore, it will be sufficient if the width a of the helical groove 4 is not smaller than the height nT of the stack 7 and if the depth b of the helical groove 4 is not smaller than the width W of the optical fiber ribbon 6. Preferably, the width a and depth b of the helical groove 4 have clearances which take account of tolerances in the manufacture of the chamber element 2 and optical fiber ribbons 6.

Figure 7A:
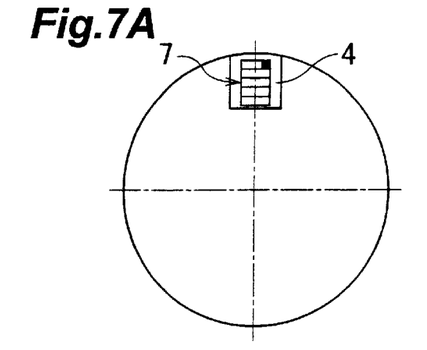
FIGS. 7A to 7G are schematic views showing respective contained states of the stack at different positions within the helical groove in the case of a conventional optical cable.
Figure 7B:
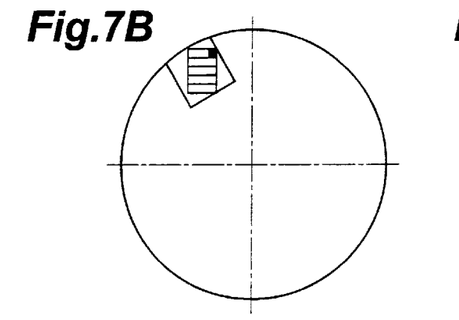
Figure 7C:
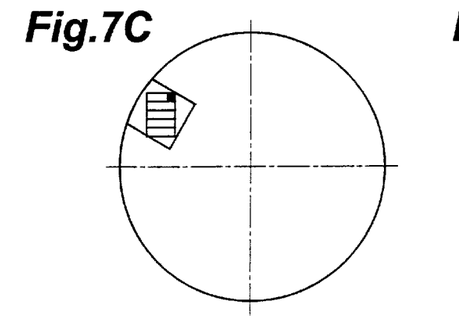
Figure 7D:
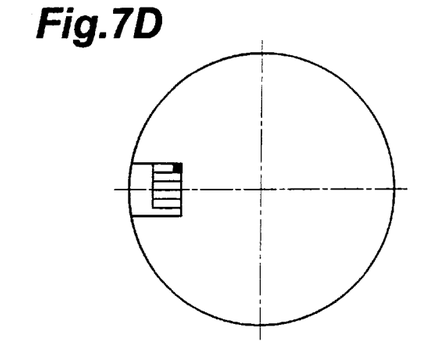
Figure 7E:
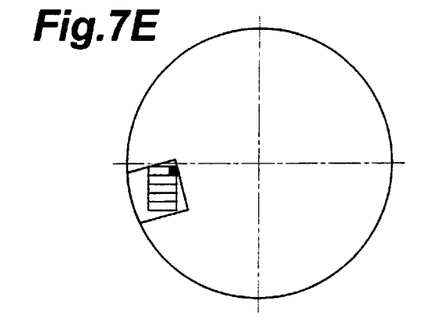
Figure 7F:
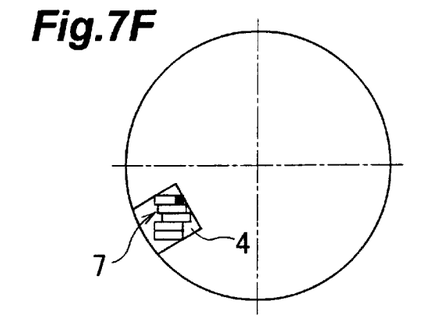
Figure 7G:
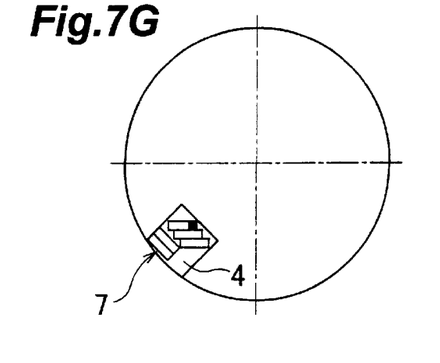

Further, from the position (d) to position (g) (see FIGS. 6D to 6G), the stack 7 is contained in the helical groove 4 so as to be shifted toward the opening 4c thereof. Here, if the width a of the helical groove 4 is not smaller than the above-mentioned diagonal L, then the stack 7 rotates in excess with respect to the helical groove 4, thereby causing the stack 7 to collapse as shown in FIGS. 7F and 7G. It is because of the fact that the individual optical fiber ribbons 6 tend to take the shortest path within the helical groove 4 in the process of making the optical cable. In particular, the optical fiber ribbons 6 closer to the bottom face 4a of the helical groove 4 tend to keep their current positions without following the relative rotation of the helical groove 4.

For appropriately preventing the stack 7 from collapsing due to such a phenomenon, the width a of the helical groove 4 is made smaller than the length of the diagonal L of the stack 7 in the area where the rotational angle with reference to the transit center portion S0 becomes 90 degrees or greater, i.e., from the position (d) to position (g) (see FIGS. 6D to 6G). Namely, employed is a groove form in which the circumscribed circle P projects out of the side wall face 4b as shown in FIG. 5, so as to prevent the stack 7 from rotating in excess.

For preventing the stack 7 from collapsing as such, it is not necessary for the above-mentioned setting to be made in all the area where the rotational angle with reference to the transit center portion S0 becomes 90 degrees or greater. The aimed object can be achieved if the above-mentioned conditions are satisfied at least in the reverse portions S1, S2.

Here, tests for verifying various characteristics in the above-mentioned embodiment were carried out. As shown in FIG. 1, the optical cable 1 in this case has five helical grooves 4, whereas five sheets of optical fiber ribbons 6 each including four optical fibers are contained in each helical groove 4. In the area from the position where the rotational angle is 90 degrees to the reverse portion S2, the width a of the helical groove 4 is reduced in proportion to the length of the chamber element 2.

The optical cable 1 was subjected to a transmission loss test under the conditions shown in Table 1 for all the one hundred optical fibers by means of OTDR (having a wavelength of 1.55 μm). The results are shown in Table 2.

TABLE 1

| Outside diameter of chamber element | Reversal angle φ | Pitch | Diagonal L of stack | Portion | Groove Width a | Groove Depth b |
|---|---|---|---|---|---|---|
| 10.0 mm | 280° | 300 mm | 1.9 mm (W = 1.1 mm, | Transit Center | 2.0 mm | 2.0 mm |

TABLE 1-continued

| Outside diameter of chamber element | Reversal angle φ | Pitch | Diagonal L of stack | Portion | Groove Width a | Groove Depth b |
|---|---|---|---|---|---|---|
| | | | T = 0.32 mm, n = 5) | 90° Reverse | 2.0 mm 1.7 mm | |

TABLE 2

| | Optical fiber itself | After contained | After Sheathing |
|---|---|---|---|
| Max. | 0.21 dB/km | 0.22 dB/km | 0.22 dB/km |
| Ave. | 0.19 dB/km | 0.20 dB/km | 0.20 dB/km |

As shown in Table 2, the difference between the transmission loss of the optical fiber ribbons 6 themselves and the transmission loss in the case where the optical fiber ribbons 6 are contained in the chamber element 2 is 0.01 dB/km at the maximum, and is also 0.01 dB/km on average. As a consequence, it has been proved that the stack 7 is appropriately prevented from collapsing within the helical groove 4 in the manufacturing process, whereby transmission loss is appropriately inhibited from increasing.

Figure 9:
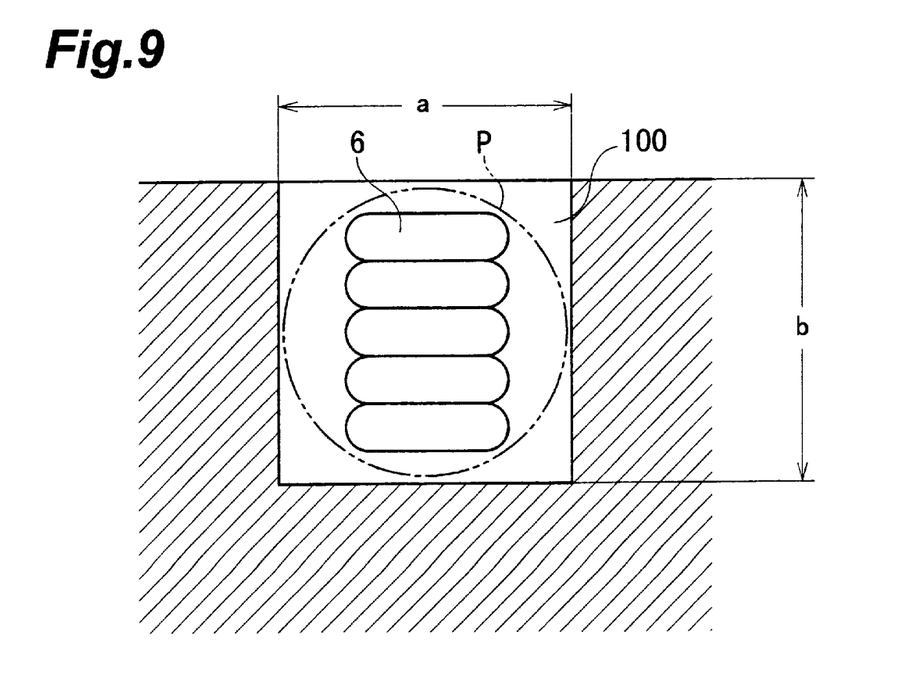
FIGS. 9 and 10 are sectional views of the helical groove in the transit center portion and reverse portion in the case of the conventional optical cable.
Figure 10:
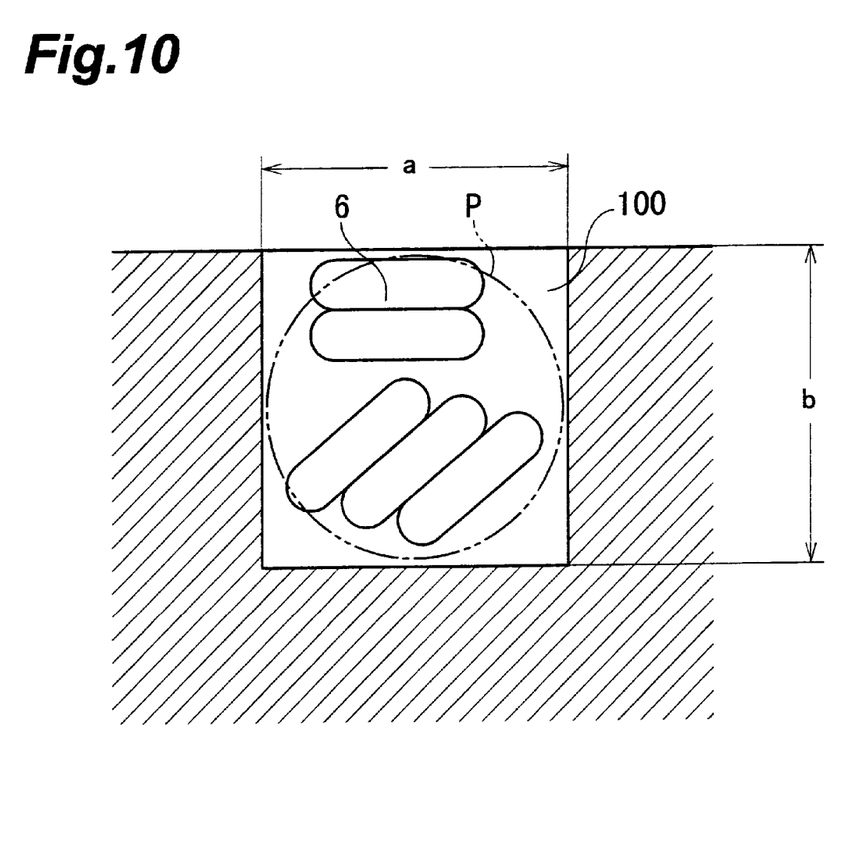

For corroborating the effect of the above-mentioned embodiment, a comparative example shown in FIGS. 9 and 10 will now be set forth, so as to verify its characteristics. In this comparative example, the width a and the depth b of a helical groove 100 are made uniform over the whole length thereof. FIG. 9 is a sectional view showing the transit center portion of the helical groove 100.

The optical cable having the configuration of the comparative example was subjected to a transmission loss test under the conditions shown in Table 3 for all the one hundred optical fibers by means of OTDR (having a wavelength of 1.55 μm). The results are shown in Table 4.

TABLE 3

| Outside diameter of chamber element | Reversal angle φ | Pitch | Diagonal L of stack | Portion | Groove Width a | Groove Depth b |
|---|---|---|---|---|---|---|
| 10.0 mm | 280° | 300 mm | 1.9 mm (W = 1.1 mm, T = 0.32 mm, n = 5) | Transit Center 90° Reverse | 2.0 mm 2.0 mm 2.0 mm | 2.0 mm |

TABLE 4

| | Optical fiber itself | After contained | After Sheathing |
|---|---|---|---|
| Max. | 0.21 dB/km | 0.25 dB/km | 0.26 dB/km |
| Ave. | 0.19 dB/km | 0.21 dB/km | 0.21 dB/km |

As shown in Table 4, the difference between the transmission loss of the optical fiber ribbons 6 themselves and the transmission loss in the case where the optical fiber ribbons 6 are contained in the chamber element 2 is 0.04 to 0.05 dB/km at the maximum, and is 0.02 dB/km on average. As a consequence, it is seen that a large transmission loss is generated in a part of the optical fiber ribbons 6, and that the collapse of the stack 7 is generated in the reverse portions S1, S2 as shown in FIGS. 7A to 7G and 10 in the manufacturing process.

Figure 11:
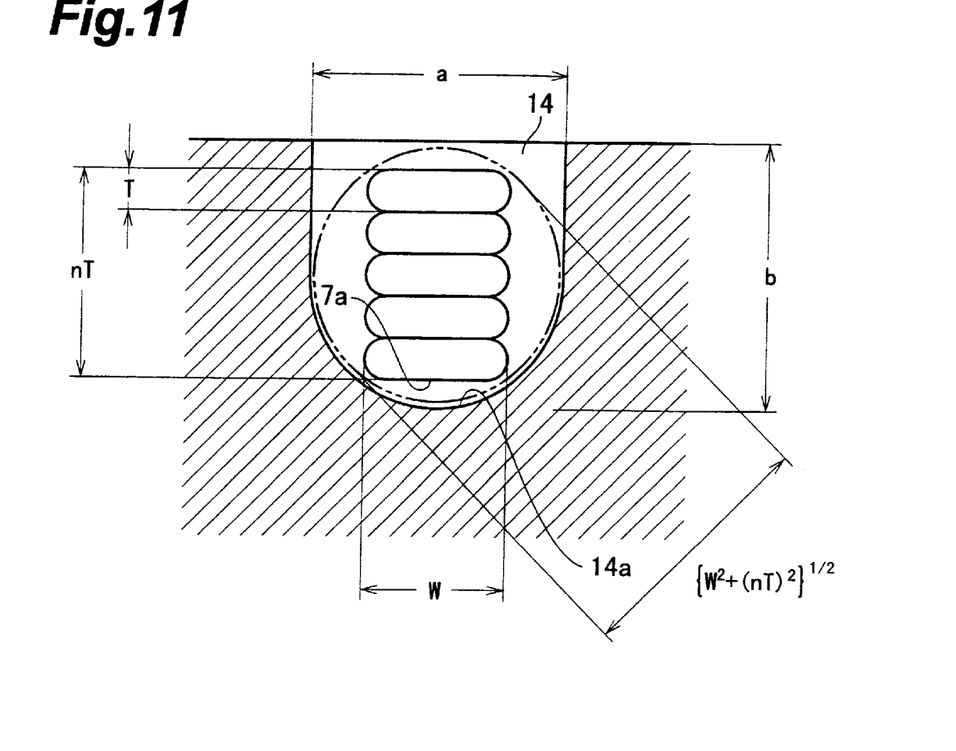
FIGS. 11 and 12 are sectional views of the helical groove in the transit center portion and reverse portion in the case of another cable in accordance with the present invention.
Figure 12:
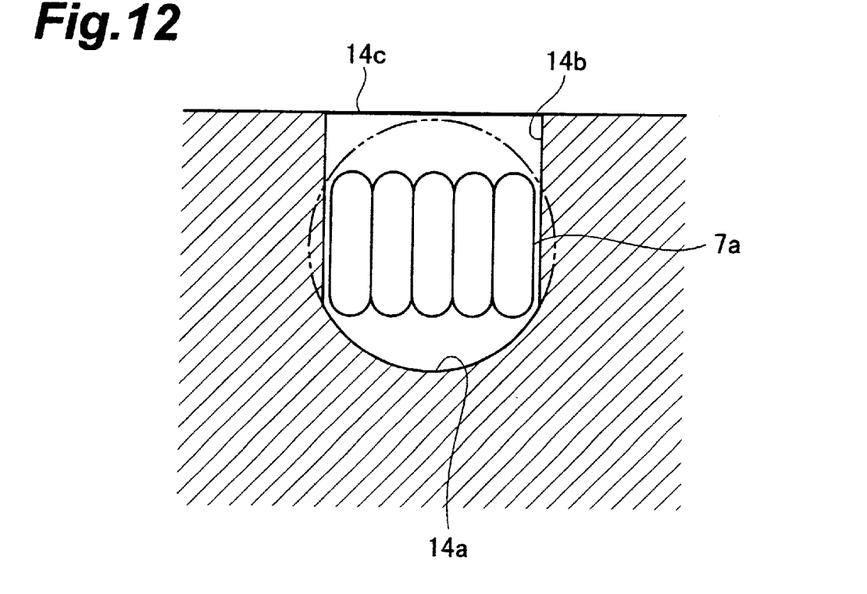

The groove is not limited to rectangular grooves, but may be a U-shaped groove such as the one shown in FIGS. 11 and 12. FIGS. 11 and 12 correspond to FIGS. 4 and 5 in the case of the above-mentioned rectangular groove 4, respectively.

In the area from the position (a) corresponding to the transit center portion S0 to the predetermined position (d) rotated by 90 degrees therefrom in FIG. 3B, whose sectional views are shown in FIGS. 6A to 6D, it is necessary that the stack 7 be rotated relative to the U-shaped helical groove 14. To this aim, it is necessary for the helical groove 14 to have such a form that a circle having a diameter equal to the diagonal L of the stack 7, when the latter is assumed to be a rectangle, is completely contained within the cross section of the helical groove 14. Namely, as in the rectangular helical groove 4 shown in FIG. 4, both of the width a and depth b are needed to be greater than the length $\sqrt{W^2+(nt)^2}$ of the diagonal L. Also, letting r be the diameter of the arc of the bottom face 14, the stack 7 can be rotated smoothly within the helical groove 14 if r≧L/2.

On the other hand, from the position (d) to the position (g) corresponding to the reverse portion S2 in FIG. 3B, whose sectional views are shown in FIGS. 6D to 6G, it is hardly necessary for the stack 7 to be rotated relative to the helical groove 14. Hence, as in the rectangular helical groove 4 shown in FIG. 5, it will be sufficient if the width a of the helical groove 14 is not smaller than the height nT of the stack 7 and if the depth b of the helical groove 14 is not smaller than the width W of the optical fiber ribbon 6. Preferably, the width a and depth b of the helical groove 14 have clearances which take account of tolerances in the manufacture of the chamber element 2 and optical fiber ribbons 6.

Without being restricted to the above-mentioned embodiments, the present invention may be provided with a LAP sheath, HS sheath, or water-absorbing tape wrap, for example, and it may be a self-supporting type cable as a matter of course. Also, the chamber element may be a linear one crawling in the longitudinal direction along the peripheral face of a body having a cylindrical form.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical cable comprising a tension member disposed at a center thereof, an elongated chamber element having at least one S-Z type helical groove whose direction of strand on an outer periphery reverses periodically, and a plurality of sheets of optical fiber ribbons stacked within said helical groove;

wherein a reversal angle from one reverse portion to a next reverse portion in said helical groove is at least 180 degrees; and wherein, letting W, T, and n be the width and thickness of each optical fiber ribbon and the number of said stacked optical fiber ribbons, respectively, and a and b be the width and depth of said helical groove, respectively, at least said reverse portions of said helical groove have a cross-sectional form satisfying:

$$nT < a \leq \sqrt{W^2+(nT)^2} \quad (1)$$

$$W < b \quad (2)$$

whereas the remaining portion of said helical groove has a cross-sectional form satisfying:

$$\sqrt{W^2+(nT)^2} < \min(a,b) \quad (3).$$

2. The optical cable according to claim 1, wherein said helical groove of said chamber element has a cross-sectional form whose bottom portion is substantially shaped like an arc.

3. The optical cable according to claim 2, wherein, letting r be the radius of the arc of the bottom portion of said helical groove, $$\frac{\sqrt{W^2+(nT)^2}}{2} \leq r \quad (4)$$

is satisfied.

4. The optical cable according to claim 1, wherein a stack constituted by a plurality of said optical fiber ribbons is contained in said helical groove with a ribbon plane thereof facing a bottom face of said helical groove in the vicinity of a transit center portion located between neighboring reverse portions, whereas said stack is contained in said helical groove with a ribbon side face thereof facing said bottom face of said helical groove in the vicinity of said reverse portions.

5. An optical cable comprising a tension member disposed at a center thereof, an elongated chamber element having at least one S-Z type helical groove whose direction of strand on an outer periphery reverses periodically, and a plurality of sheets of optical fiber ribbons stacked within said helical groove of said chamber element;

wherein a reversal angle from one reverse portion to a next reverse portion in said helical groove is at least 180 degrees; and wherein, letting W, T, and n be the width and thickness of each optical fiber ribbon and the number of said stacked optical fiber ribbons, respectively, and a and b be the width and depth of said helical groove, respectively, said helical groove has a cross-sectional form satisfying:

$$nT < a \leq \sqrt{W^2+(nT)^2} \quad (1)$$

$$W < b \quad (2)$$

in an area where a rotational angle with reference to a transit center portion located between neighboring reverse portions is at least 90 degrees, whereas the remaining portion of said helical groove has a cross-sectional form satisfying:

$$\sqrt{W^2+(nT)^2} < \min(a,b) \quad (3).$$

6. The optical cable according to claim 5, wherein said helical groove of said chamber element has a cross-sectional form whose bottom portion is substantially shaped like an arc.

7. The optical cable according to claim 6, wherein, letting r be the radius of the arc of the bottom portion of said helical groove, $$\frac{\sqrt{W^2 + (nT)^2}}{2} \leq r \qquad (4)$$

is satisfied.

8. The optical cable according to claim 5, wherein a stack constituted by a plurality of said optical fiber ribbons is contained in said helical groove with a ribbon plane thereof facing a bottom face of said helical groove in the vicinity of the transit center portion located between neighboring reverse portions, whereas said stack is contained in said helical groove with a ribbon side face thereof facing said bottom face of said helical groove in the vicinity of said reverse portions.

* * * * *